(12) United States Patent
Singh et al.

(10) Patent No.: US 10,841,305 B2
(45) Date of Patent: Nov. 17, 2020

(54) AUTHENTICATING FOR A SOFTWARE SERVICE

(71) Applicant: BlackBerry Limited, Waterloo (CA)

(72) Inventors: Manvinder Singh, Bedford (CA); Mendel Elliot Spencer, Ottawa (CA)

(73) Assignee: BlackBerry Limited, Ontario (CA)

(*) Notice: Subject to any disclaimer, the term of this patent is extended or adjusted under 35 U.S.C. 154(b) by 257 days.

(21) Appl. No.: 15/722,764

(22) Filed: Oct. 2, 2017

(65) Prior Publication Data
US 2019/0104123 A1    Apr. 4, 2019

(51) Int. Cl.
*H04L 29/06* (2006.01)
*H04L 9/32* (2006.01)
*G06F 21/33* (2013.01)

(52) U.S. Cl.
CPC .......... *H04L 63/0884* (2013.01); *G06F 21/33* (2013.01); *H04L 9/3239* (2013.01); *H04L 63/0815* (2013.01); *H04L 63/083* (2013.01)

(58) Field of Classification Search
CPC ............. H04L 63/0884; H04L 63/0815; H04L 9/3239; H04L 63/083; G06F 21/33
See application file for complete search history.

(56) References Cited

U.S. PATENT DOCUMENTS

| | | |
|---|---|---|
| 9,276,917 B2 | 3/2016 | McColgan |
| 2011/0289573 A1 | 11/2011 | Seidl et al. |
| 2014/0020073 A1 | 1/2014 | Ronda et al. |
| 2014/0075515 A1 | 3/2014 | McColgan |
| 2015/0341353 A1* | 11/2015 | Zhou ............... H04L 9/3268 713/175 |
| 2018/0373862 A1* | 12/2018 | Feijoo ............... G06F 21/41 |

FOREIGN PATENT DOCUMENTS

| | | |
|---|---|---|
| EP | 1879324 | 1/2008 |
| WO | 0245452 | 6/2002 |
| WO | 2011066658 | 6/2011 |

OTHER PUBLICATIONS

Extended European Search Report issued in European Application No. 18197794.3 dated Dec. 4, 2018, 7 pages.

* cited by examiner

*Primary Examiner* — Meng Li
(74) *Attorney, Agent, or Firm* — Fish & Richardson P.C.

(57) ABSTRACT

Systems, methods, and software can be used to provide authentication for a software service. In some aspects, an identity provider (IDP) receives an identity authentication request from a client device. The IDP transmits an on-premises verification initiation request for a digest authentication to on-premises directory provider (OPDP). The IDP receives an on-premises verification initiation request. The an on-premises verification initiation request includes one or more digest authentication attributes. The IDP transmits the one or more digest authentication attributes. The IDP receives a digest, wherein the digest is calculated based on the one or more digest authentication attributes and one or more identity authentication credentials. The IDP transmits the digest, and receives an on-premises verification response that indicates a result of the digest authentication.

20 Claims, 3 Drawing Sheets

AUTHENTICATING FOR A SOFTWARE SERVICE

TECHNICAL FIELD

The present disclosure relates to providing authentication for a software service.

BACKGROUND

In some cases, an identity authentication procedure may be performed in order to obtain software services from a service provider. For example, a client device that initiates a service request may be redirected to an identity provider. The client device may provide authentication credentials to the identity provider. The service request may be granted if the authentication credentials are validated.

DESCRIPTION OF DRAWINGS

Like reference numbers and designations in the various drawings indicate like elements.

DETAILED DESCRIPTION

In some cases, the identity provider (IDP) may interact with a directory service provider to perform the identity authentication. For example, the directory service provider can have access to identity authentication credentials, e.g., usernames and passwords, that are stored in a secure platform within the enterprise network. The directory service provider can be an on-premises directory provider (OPDP). A directory service provider is on-premises if the directory service provider operates inside of the enterprise network. For example, the directory service provider can be on the physical premises, e.g., inside the building or the campus that is owned or operated by the enterprise, and connected to the enterprise network via, for example, a wired connection or a secured WiFi network. A directory service provider can also be on-premises if the directory service provider is operating within the virtual premises of the enterprise, e.g., the directory service provider is connected to the enterprise network using a virtual private network (VPN) connection.

To maintain the security of these identity authentication credentials, the enterprise may prevent these identity authentication credentials from being accessed from outside of the enterprise network. In some cases, the IDP may be implemented outside of the enterprise network, for example, in a cloud. Therefore, to validate the authentication credentials received from a client device, the IDP can send the authentication credentials to the OPDP inside the enterprise network for verification. However, such operations may introduce security risks. For example, the authentication credentials are exposed to IDP and thus may be subject to malicious attacks on the IDP. Furthermore, the authentication credentials may also be subject to malicious attacks on the transmission paths between the IDP and the OPDP.

In some cases, instead of transmitting the authentication credentials to the OPDP, the IDP can transmit a digest to the OPDP. The digest can be calculated by the client device using the digest authentication attributes provided by the OPDP and the authentication credentials. In some cases, the OPDP or the IDP can provide a script to the client device for calculating the digest. The OPDP can validate the digest and transmit the validation result to the IDP. This approach prevents the authentication credentials to be exposed to the IDP or the transmission paths between the IDP and the OPDP, and therefore improves the security of the identity authentication process. FIGS. 1-4 and associated descriptions provide additional details of these implementations.

Figure 1:
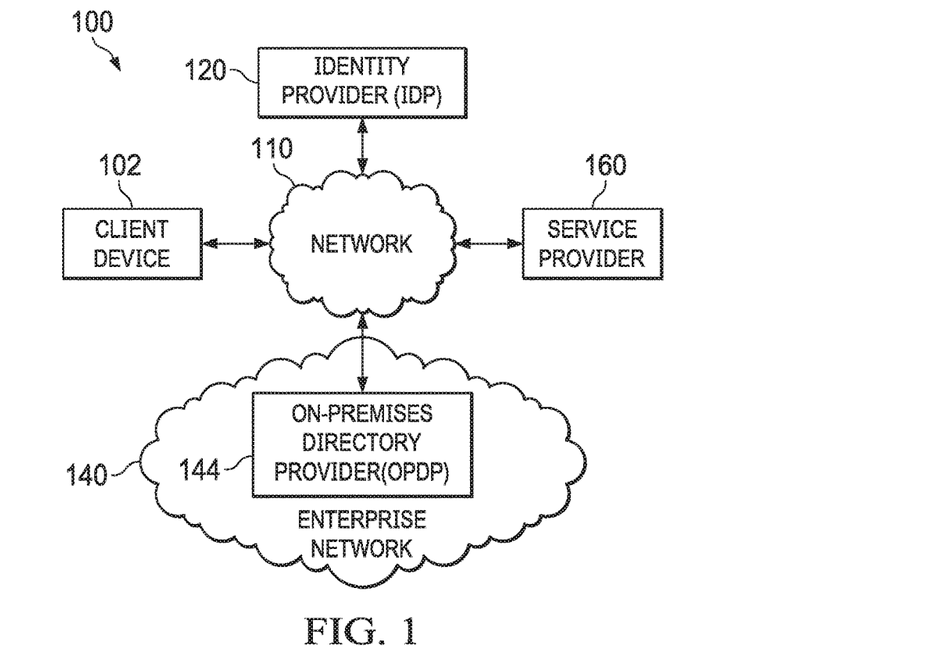
FIG. 1 is a schematic diagram showing an example communication system that provides identity authentication for a software service, according to an implementation.

FIG. 1 is a schematic diagram showing an example communication system 100 that provides identity authentication for a software service, according to an implementation. At a high level, the example communication system 100 includes a client device 102, a service provider (SP) 160, an identity provider (IDP) 120, and an enterprise network 140 that are communicatively coupled with a network 110.

Figure 2:
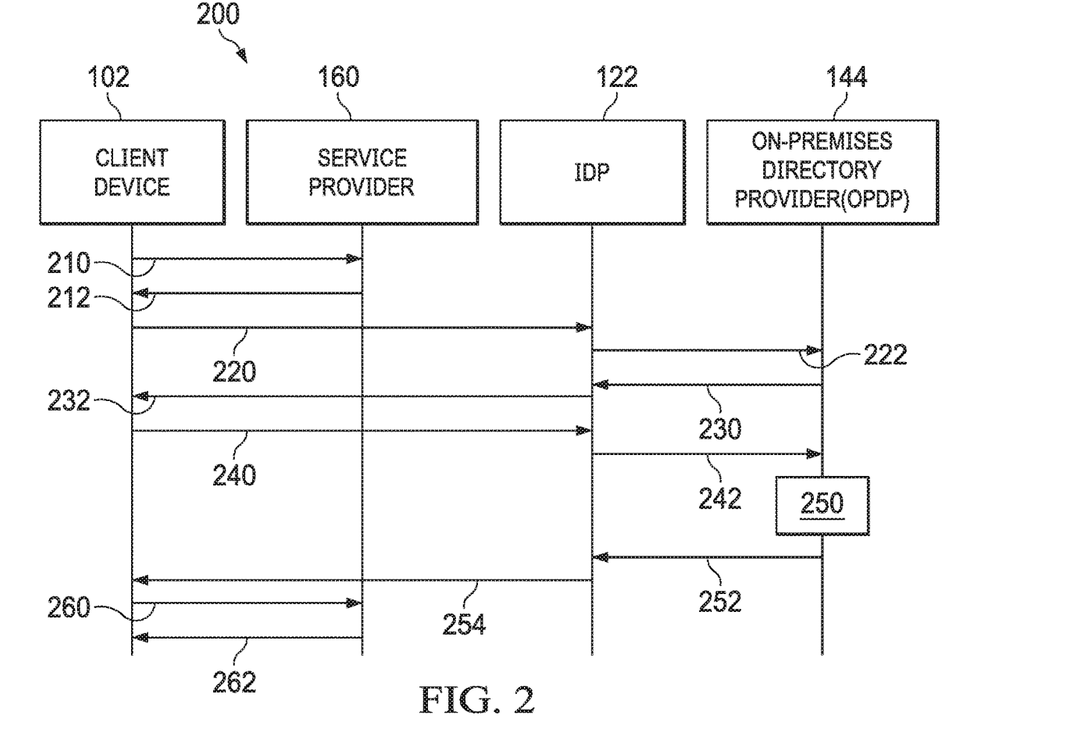
FIG. 2 is a flow diagram showing an example process that provides identity authentication for a software service, according to an implementation.
Figure 3:
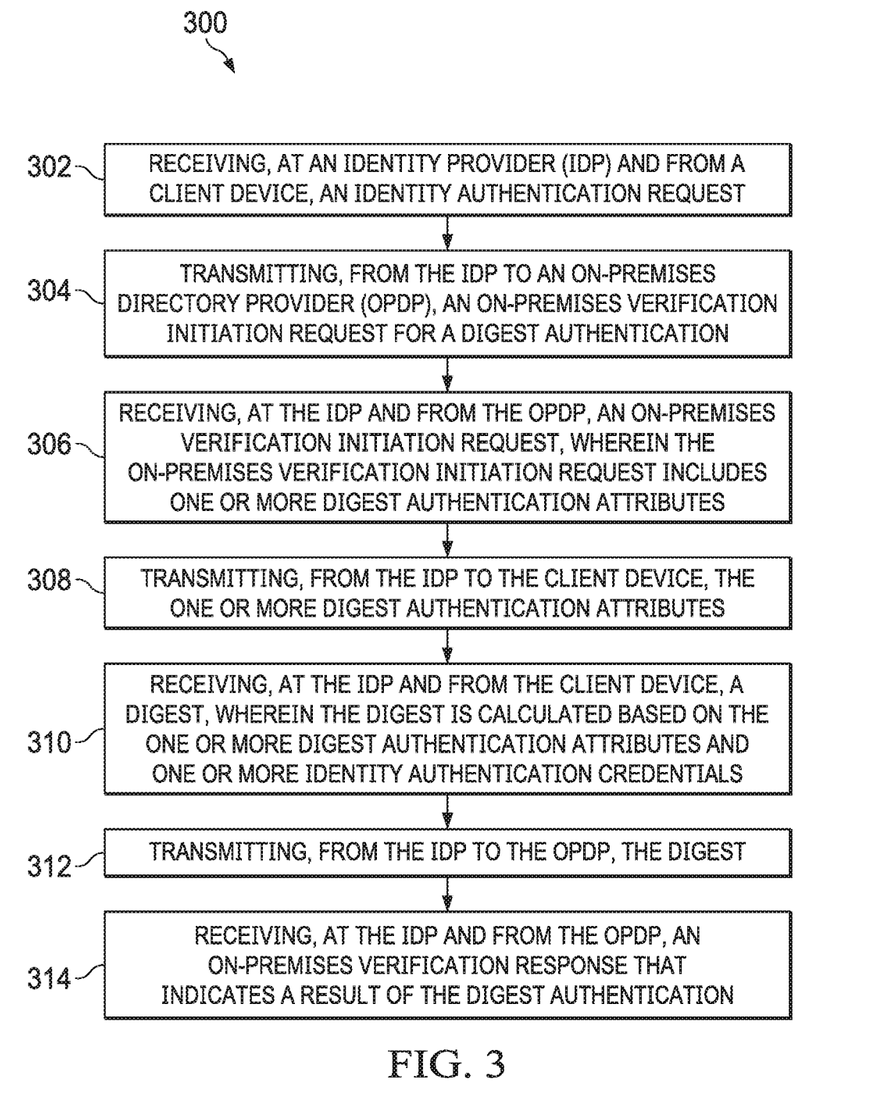
FIG. 3 is a flow diagram showing an example method that provides identity authentication for a software service, according to an implementation.
Figure 4:
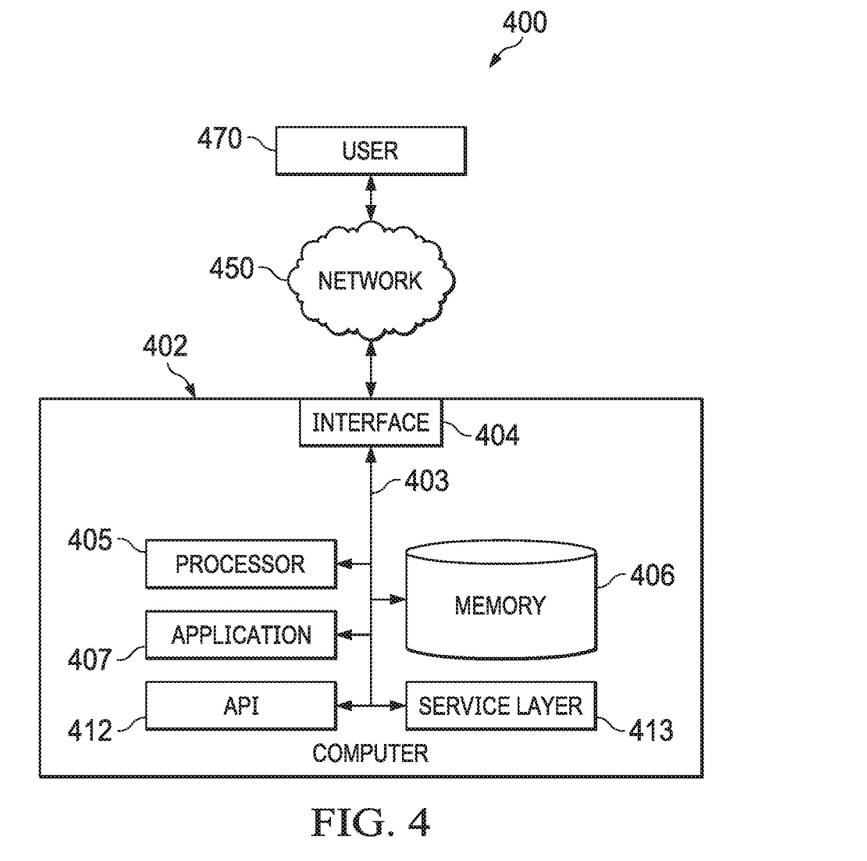
FIG. 4 is a high-level architecture block diagram of a computing system, according to an implementation.

The SP 160 represents an application, a set of applications, software, software modules, hardware, or any combination thereof that can be configured to provide software services. The software services can include access to enterprise resources, e.g., file systems, websites, portals. The software services can also include services that are provided using client applications, e.g., email, messaging, file sharing, or other applications. Examples of the software service provided by the SP 160 can include software as a service (SaaS) applications such as SALEFORCE, OFFICE 365, or other software application services. In some cases, access to software services can be granted to users that are authenticated. In these or other cases, the SP 160 can transmit an authentication initiation message for identity authentication, and receive an authentication response indicating whether the identity authentication is successful. FIGS. 2-4 and associated descriptions provide additional details of these implementations.

The enterprise network 140 represents an internal network of an enterprise that can connect one or more computing devices of the enterprise. The enterprise network 140 can include a wireless network, a wireline network, or a combination thereof. In some cases, the enterprise network 140 can include an enterprise firewall that manages communications between computing devices inside of enterprise network 140 and computing devices outside of the enterprise network 140, e.g., through the network 110.

The enterprise network 140 can include an on-premises directory provider (OPDP) 144. The OPDP 144 represents an application, a set of applications, software, software modules, hardware, or any combination thereof that can be configured to perform on-premises identity authentications. In some cases, the OPDP 144 can receive an on-premises verification initiation request from the IDP 120, generate digest authentication attributes and send the digest authentication attributes to the IDP 120, receive a digest from the IDP 120, and perform identity authentication based on the received digest. FIGS. 2-4 and associated descriptions provide additional details of these implementations.

In some cases, the OPDP 144 can be implemented on an enterprise mobility management (EMM) server. The EMM server represents an application, a set of applications, software, software modules, hardware, or any combination thereof that can be configured to manage applications and devices for an enterprise. For example, the EMM server can install, update, and manage the license of software services provided by the SP 160, install, update, and manage enterprise applications on client device 102, configure security policies executed by the IDP 120, or a combination thereof. Alternatively, the OPDP 144 can be implemented on a platform that is different than the EMM server. In some cases, the OPDP 144 can be implemented using directory service platforms such as MICROSOFT ACTIVE DIRECTORY.

The IDP 120 represents an application, set of applications, software, software modules, hardware, or combination thereof that can be configured to identify an entity. In some cases, the IDP 120 can also be referred to as an identity assertion provider or an identity server. In some cases, the IDP 120 can be implemented on a cloud computing platform. The IDP 120 can validate, for a client device 102 or a user using the client device 102, requests to access the software service provided by the SP 160. In some cases, the IDP 120 can perform a registration procedure with the OPDP 144 to exchange keys, perform identity authentication for the client device 102, generate and transmit messages related to on-premises verification. FIGS. 2-4 and associated descriptions provide additional details of these implementations.

The client device 102 represents an electronic device that accesses a software service at the SP 160. In some cases, a browser or a client application can be executed on the client device 102 to communicate service requests and service responses with the SP 160 and authentication requests and responses with the IDP 120 and the OPDP 144. The browser or the client application can be configured to support Security Assertion Markup Language (SAML) protocol, OpenID Connect protocol, or a combination thereof that can be used to format the one or more messages used in the on-premises verification procedures. FIGS. 2-4 and associated descriptions provide additional details of these implementations.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications device having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

The example communication system 100 includes the network 110. The network 110 represents an application, set of applications, software, software modules, hardware, or combination thereof, that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example process 200 that provides identity authentication for a software service, according to an implementation. The process 200 can be implemented by one or more entities shown in FIG. 1, or any other systems or modules that provide authentications for a software service. For example, the process 200 can be implemented by the client device 102, the SP 160, the IDP 122, and the OPDP 144, or a combination thereof. The example process 200, shown in FIG. 2, can also be implemented using additional, fewer, or different operations, which can be performed in the order shown or in a different order.

The example process 200 begins at 210, where the client device 102 transmits a service request to the SP 160. The service request can include a request for a software service provided by the SP 160. In some cases, the service request can be initiated by a browser executed on the client device 102. For example, a user can input a Uniform Resource Locator (URL) that points to the software service provided by the SP 160 to the browser. The browser can generate a request, e.g., an HTTP or HTTPS request, that requests the software service. The request can include information indicating the service that is requested. Alternatively or additionally, a client application executed on the client device 102 can generate the service request that is transmitted from the client device 102 to the SP 160.

At 212, the SP 160 transmits an authentication initiation message to the client device 102 to perform an identity authentication process. In some cases, the SP 160 determines that the service request is for a software service that requires identity authentication, and the authentication initiation message is transmitted in response to the determination that the identity authentication is required. In some cases, the authentication initiation message can be a Security Assertion Markup Language (SAML) command or an OpenID authentication request that redirects the client device 102 towards the IDP 122. The authentication initiation message can include information associated with the IDP 122, e.g., the address of the IDP 122, the service that is requested at 210, or a combination thereof.

At 220, the client device 102 transmits an authentication request message for identity authentication to the IDP 122. In some cases, the browser on the client device 102 can be used to generate the authentication request message. In some cases, the authentication request message can be an SAML request or an OpenID Connect request. In some cases, the authentication request message can include information identifying the client device 102, the software service that is requested, whether a user interface interaction is prompted, the scope of the access request, the level of authentication or assurance required, the version of the authentication protocol, the type of response required, where responses should be sent, or any combinations thereof.

At 222, the IDP 122 transmits an on-premises verification initiation request to the OPDP 144. In some cases, the on-premises verification request is transmitted after the IDP 122 determines that an on-premises digest authentication process is to be performed. For example, the IDP 122 can determine to perform the on-premises digest authentication process based on the types of software service requested, the identity of the client device 102 or the identity of a user group to which the client device 102 belongs, the scope of the access request, or any other criteria. In some cases, an EMM server or other enterprise servers that manage the client device 102 can configure these criteria on the IDP 122. In some cases, if the IDP 122 determines that an on-premises digest authentication process is not be performed based on these criteria, the IDP 122 can request authentication credentials from the client device 102 without requesting digest authentication attributes from the OPDP 144.

At 230, the OPDP 144 transmits an on-premises verification initiation response to the IDP 122. The on-premises verification response includes one or more attributes used for digest authentication. The one or more attributes can include a realm attribute. The realm attribute indicates an address of the OPDP 144 or a set of protection spaces associated with the OPDP 144 that are used to perform the digest authentication for this on-premises verification. In some cases, the realm attribute can be represented in the format of an email address. The one or more attributes can also include a nonce attribute. In some implementations, the nonce attribute can be a random number generated by the OPDP 144.

At 232, the IDP 122 transmits a digest authentication request message to the client device 102. The digest authentication request message can include the digest authentication attributes received at 232. In some cases, the digest authentication request message can be a redirect command that redirects a browser on the client device 102 to a login page, where a user of the client device 102 can input identity authentication credentials. Examples of the identity authentication credentials can include a username, a password, answers to security verification questions, a gesture, a biometrics input, or any combinations thereof. In some cases, as discussed previously, the client device 102 can be redirected to a login page. A user can input the username and password in the login page at the client device 102.

At 240, the client device 102 transmits a digest authentication response message to the IDP 122. The digest authentication response message can include a digest. The digest is calculated by the client device 102 based on the identity authentication credentials and the digest authentication attributes. In some cases, the client device 102 calculates the digest using a cryptographic hashing algorithm. In one example, an MD5 hashing algorithm is used as a default hashing algorithm to compute the digest. In another example, a different hashing algorithm can be used instead of the MD5 hashing algorithm. For example, a client side script that contains instructions of the different hashing algorithm can be sent to the client device 102, either at step 232 along with the digest authentication attributes, or at a separate step performed before 240. The client side script can be executed by a browser or a client application operating on the client device 102. Examples of the client side script can include JavaScript, Flash, or Silverlight. The client device 102 can use the client side script to generate the digest based on the identity authentication credentials and the digest authentication attributes.

At 242, the IDP 122 transmits an on-premises verification request to the OPDP 144. The on-premises verification request includes the digest received from the client device 102. At 250, the OPDP 144 validates the identity of the client device 102 or the user operating the client device 102 based on the received digest. In some implementations, the OPDP 144 retrieves the stored credentials, e.g., username and password, associated with the client device 102 or the user operating the client device 102, and calculates a verifying digest based on the stored credentials and the digest authentication attributes. In some cases, the retrieved credentials can also be credentials that are derived from usernames and passwords. For example, in some implementations, pre-calculated hashes derived from the user name and the password can be stored and retrieved for digest verifications. The OPDP 144 can determine whether the authentication is successful based on whether the verifying digest matches the received digest. In some cases, the OPDP 144 can calculate the verifying digest by using a dynamic link library (DLL) that implements the same hashing algorithm used by the client device 102 to calculate the digest. In some cases, the OPDP 144 or an EMM server that manages the client device 102 can configure a specific hashing algorithm used to compute the digest. The OPDP 144 can transmit the client side script that implements the specific hashing algorithm to the IDP 122, and the IDP 122 can forward the client side script to the client device 102 as discussed previously.

At 252, the OPDP 144 transmits an on-premises verification response to the IDP 122. The on-premises verification response indicates the result of the digest verification to the IDP 122. At 254, the IDP 122 transmits an authentication response message to the client device 102. The authentication response message indicates the result of the digest verification to the client device 102. In some cases, the authentication response message can include an authorization token that indicates whether the authentication succeeds or fails. In some cases, the authorization token can also be signed with a key of the IDP 122, and therefore can be validated by the SP 160. In some cases, the authentication token can be formatted as an SAML assertion, an OpenID Connect ID Token, or an Open Authorization (OAUTH) Access token.

At 260, the client device 102 forwards the authentication response, or the authentication token included in the authentication response, to the SP 160. The SP 160 can determine whether the identity of the client device 102 has been successfully validated based on the authentication response or the authentication token. At 262, the SP 160 transmits a service response. If the identity validation succeeds, the service response indicates that the service request is granted. If the identity validation fails, the service response indicates that the service request is rejected.

In some cases, one or more messages exchanged between the IDP 122 and the OPDP 144 described previously, e.g., the on-premises verification initiation request, the on-premises verification initiation response, the on-premises verification request, on-premises verification response or any combinations thereof, can be transmitted according to a Hypertext Transfer Protocol (HTTP) protocol or a Hypertext Transfer Protocol (HTTPS) protocol. Alternatively, other standardized or proprietary protocols can be used to transmit these messages.

FIG. 3 is a flow diagram showing an example method 300 that provides identity authentication for a software service, according to an implementation. The method 300 can be implemented by an IDP, e.g., the IDP 120 shown in FIG. 1. The method 300 shown can also be implemented using additional, fewer, or different entities. Furthermore, the method 300 can be implemented using additional, fewer, or different operations, which can be performed in the order shown or in a different order.

The example method 300 begins at 302, where an IDP receives an identity authentication request from a client device. At 304, the IDP transmits an on-premises verification initiation request to an OPDP for a digest authentication. In some cases, the IDP determines that the digest authentication is to be performed based on the identity authentication request prior to transmitting the on-premises verification initiation request, and the on-premises verification initiation request is transmitted in response to determining that the digest authentication is to be performed. At 306, the IDP receives an on-premises verification initiation request from the OPDP. The on-premises verification initiation request includes one or more digest authentication attributes. In some cases, the one or more digest authentication attributes include at least one of a realm attribute or a nonce attribute. In some cases, the one or more digest authentication attributes are generated by the OPDP. At 308, the IDP transmits the one or more digest authentication attributes to the client device. At 310, the IDP receives a digest from the client device. The digest is calculated based on the one or more digest authentication attributes and one or more identity authentication credentials. In some cases, the digest is calculated by the client device using a cryptographic hashing algorithm. In some cases, the cryptographic hashing algorithm is an MD5 hashing algorithm. In some cases, the digest is calculated by the client device using a script transmitted from the IDP to the client device. At 312, the IDP transmits the digest to the OPDP. At 314, the IDP receives an on-premises verification response from the OPDP. The on-premises verification response indicates a result of the digest authentication.

FIG. 4 is a high-level architecture block diagram of a computing system 400, according to an implementation. At a high level, the illustrated system 400 includes a computer 402 that is communicably coupled with a network 450. The described illustration is only one possible implementation of the described subject matter and is not intended to limit the disclosure to the single described implementation. Those of ordinary skill in the art will appreciate the fact that the described components can be connected, combined, or used in alternative ways consistent with this disclosure.

The network 450 facilitates communications between the components of the system 400. In some cases, a user, e.g., an administrator can access the computer 402 from a remote network. In these or other cases, the network 450 can be a wireless or a wireline network. In some cases, a user can access the computer 402 locally. In these or other cases, the network 450 can also be a memory pipe, a hardware connection, or any internal or external communication paths between the components.

The computer 402 includes a computing system configured to provision on-premises verifications. For example, the computer 402 can be included in a client device, an identity provider, an OPDP, or other entities in the system 100, to perform the algorithm described in this disclosure. In some cases, the algorithm can be implemented in an executable computing code, e.g., C/C++ executable codes. Alternatively or in combination, the algorithm can be implemented in an application program, e.g., EXCEL. In some cases, the computer 402 can include a standalone Linux system that runs batch applications. In some cases, the computer 402 can include mobile or personal computers that run the application program.

The computer 402 may include an input device, such as a keypad, keyboard, touch screen, microphone, speech recognition device, other device that can accept user information, and/or an output device that conveys information associated with the operation of the computer 402, including digital data, visual and/or audio information, or a GUI.

The computer 402 can serve as a client, network component, a server, a database or other persistency, and/or any other component of the system 400. In some implementations, one or more components of the computer 402 may be configured to operate within a cloud-computing-based environment.

At a high level, the computer 402 is an electronic computing device operable to receive, transmit, process, store, or manage data and information associated with the system 400. According to some implementations, the computer 402 may also include, or be communicably coupled with, an application server, e-mail server, web server, caching server, streaming data server, business intelligence (BI) server, and/or other server.

The computer 402 can receive requests over network 450 from a client application (e.g., executing on another computer 402) and respond to the received requests by processing the said requests in an appropriate software application. In addition, requests may also be sent to the computer 402 from internal users (e.g., from a command console or by another appropriate access method), external or third parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403, using an application programming interface (API) 412 and/or a service layer 413. The API 412 may include specifications for routines, data structures, and object classes. The API 412 may be either computer language-independent or -dependent and refer to a complete interface, a single function, or even a set of APIs. The service layer 413 provides software services to the computer 402 and/or the system 400. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in Extensible Markup Language (XML) format or other suitable format. While illustrated as an integrated component of the computer 402, alternative implementations may illustrate the API 412 and/or the service layer 413 as stand-alone components in relation to other components of the computer 402. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, configurations, or particular implementations of the computer 402. The interface 404 is used by the computer 402 for communicating with other systems in a distributed environment—including within the system 400—connected to the network 450—(whether illustrated or not). Generally, the interface 404 comprises logic encoded in software and/or hardware in a suitable combination and operable to communicate with the network 450. More specifically, the interface 404 may comprise software supporting one or more communication protocols associated with communications such that the network 450 or interface's hardware is operable to communicate physical signals within and outside of the illustrated system 400.

The computer 402 includes a processor 405. Although illustrated as a single processor 405 in FIG. 5, two or more processors may be used according to particular needs, configurations, or particular implementations of the computer 402. Generally, the processor 405 executes instructions and manipulates data to perform the operations of the computer 402. In some cases, the processor 405 can include a data processing apparatus.

The computer 402 also includes a memory 406 that holds data for the computer 402. Although illustrated as a single memory 406 in FIG. 4, two or more memories may be used according to particular needs, configurations, or particular implementations of the computer 402. While memory 406 is illustrated as an integral component of the computer 402, in alternative implementations, memory 406 can be external to the computer 402.

The application 407 is an algorithmic software engine providing functionality according to particular needs, configurations, or particular implementations of the computer 402, particularly with respect to functionality required for performing the algorithm described herein. Although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, the system 400 and communicating over network 450. Further, the terms "client," "user," and other appropriate terminology may be used interchangeably, as appropriate, without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
receiving, at an identity provider (IDP) and from a client device, an identity authentication request, wherein the IDP performs identifications for accessing a software service that is provided by a software service provider;
transmitting, from the IDP to an on-premises directory provider (OPDP), an on-premises verification initiation request for a digest authentication, wherein the OPDP performs identity authentication for accessing the software service and the OPDP operates inside of an enterprise network, and the IDP operates outside of the enterprise network;
receiving, at the IDP and from the OPDP, an on-premises verification initiation response, wherein the on-premises verification initiation response includes one or more digest authentication attributes including a realm attribute;
transmitting, from the IDP to the client device, the one or more digest authentication attributes;
receiving, at the IDP and from the client device, a digest, wherein the digest is calculated based on the one or more digest authentication attributes and one or more identity authentication credentials;
transmitting, from the IDP to the OPDP, the digest; and
receiving, at the IDP and from the OPDP, an on-premises verification response that indicates a result of the digest authentication.

2. The method of claim 1, wherein the one or more digest authentication attributes include a nonce attribute.

3. The method of claim 1, wherein the one or more digest authentication attributes are generated by the OPDP.

4. The method of claim 1, wherein the digest is calculated by the client device using a cryptographic hashing algorithm.

5. The method of claim 4, wherein the cryptographic hashing algorithm comprises an MD5 hashing algorithm.

6. The method of claim 1, wherein the digest is calculated by the client device using a script transmitted from the IDP to the client device.

7. The method of claim 1, further comprising:
determining that the digest authentication is to be performed based on the identity authentication request; and
wherein the on-premises verification initiation request is transmitted in response to determining that the digest authentication is to be performed.

8. An identity provider (IDP), comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
receiving, at the IDP and from a client device, an identity authentication request, wherein the IDP performs identifications for accessing a software service that is provided by a software service provider;
transmitting, from the IDP to an on-premises directory provider (OPDP), an on-premises verification initiation request for a digest authentication, wherein the OPDP performs identity authentication for accessing the software service and the OPDP operates inside of an enterprise network, and the IDP operates outside of the enterprise network;
receiving, at the IDP and from the OPDP, an on-premises verification initiation response, wherein the on-premises verification initiation response includes one or more digest authentication attributes including a realm attribute;
transmitting, from the IDP to the client device, the one or more digest authentication attributes;
receiving, at the IDP and from the client device, a digest, wherein the digest is calculated based on the one or more digest authentication attributes and one or more identity authentication credentials;
transmitting, from the IDP to the OPDP, the digest; and
receiving, at the IDP and from the OPDP, an on-premises verification response that indicates a result of the digest authentication.

9. The IDP of claim 8, wherein the one or more digest authentication attributes include a nonce attribute.

10. The IDP of claim 8, wherein the one or more digest authentication attributes are generated by the OPDP.

11. The IDP of claim 8, wherein the digest is calculated by the client device using a cryptographic hashing algorithm.

12. The IDP of claim 11, wherein the cryptographic hashing algorithm comprises an MD5 hashing algorithm.

13. The IDP of claim 8, wherein the digest is calculated by the client device using a script transmitted from the IDP to the client device.

14. The IDP of claim 8, the operations further comprising:
determining that the digest authentication is to be performed based on the identity authentication request; and
wherein the on-premises verification initiation request is transmitted in response to determining that the digest authentication is to be performed.

15. A non-transitory computer-readable medium containing instructions which, when executed, cause a computing device to perform operations comprising:
receiving, at an identity provider (IDP) and from a client device, an identity authentication request, wherein the IDP performs identifications for accessing a software service that is provided by a software service provider;
transmitting, from the IDP to an on-premises directory provider (OPDP), an on-premises verification initiation request for a digest authentication, wherein the OPDP performs identity authentication for accessing the software service and the OPDP operates inside of an enterprise network, and the IDP operates outside of the enterprise network;
receiving, at the IDP and from the OPDP, an on-premises verification initiation response, wherein the on-premises verification initiation response includes one or more digest authentication attributes including a realm attribute;
transmitting, from the IDP to the client device, the one or more digest authentication attributes;
receiving, at the IDP and from the client device, a digest, wherein the digest is calculated based on the one or more digest authentication attributes and one or more identity authentication credentials;
transmitting, from the IDP to the OPDP, the digest; and
receiving, at the IDP and from the OPDP, an on-premises verification response that indicates a result of the digest authentication.

16. The computer-readable medium of claim 15, wherein the one or more digest authentication attributes include a nonce attribute.

17. The computer-readable medium of claim 15, wherein the one or more digest authentication attributes are generated by the OPDP.

18. The computer-readable medium of claim 15, wherein the digest is calculated by the client device using a cryptographic hashing algorithm.

19. The computer-readable medium of claim 18, wherein the cryptographic hashing algorithm comprises an MD5 hashing algorithm.

20. The computer-readable medium of claim 15, wherein the digest is calculated by the client device using a script transmitted from the IDP to the client device.

* * * * *